(12) United States Patent
Lewis et al.

(10) Patent No.: US 11,267,322 B2
(45) Date of Patent: *Mar. 8, 2022

(54) REMOVABLE DOOR SURROUND FOR A FOLDING SOFT TOP

(71) Applicant: Bestop, Inc., Louisville, CO (US)

(72) Inventors: Stephen J. Lewis, Harrison Township, MI (US); David A. Smith, Macomb Township, MI (US); Duane C. Junkin, Madison Heights, MI (US); Jonathon G. Moore, Macomb Township, MI (US)

(73) Assignee: Bestop, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,376

(22) Filed: Mar. 12, 2020

(65) Prior Publication Data

US 2020/0207197 A1 Jul. 2, 2020

Related U.S. Application Data

(63) Continuation of application No. 15/958,025, filed on Apr. 20, 2018, now Pat. No. 10,618,394.

(60) Provisional application No. 62/487,763, filed on Apr. 20, 2017.

(51) Int. Cl.
*B60J 7/10* (2006.01)
*B60J 7/12* (2006.01)
*B60J 10/36* (2016.01)
*B60J 10/90* (2016.01)

(52) U.S. Cl.
CPC ............... *B60J 7/10* (2013.01); *B60J 7/104* (2013.01); *B60J 7/1226* (2013.01); *B60J 7/1291* (2013.01); *B60J 10/36* (2016.02); *B60J 10/90* (2016.02)

(58) Field of Classification Search
CPC . B60J 7/1291; B60J 7/1858; B60J 7/10; B60J 7/104; B60J 7/1226
USPC ...... 296/219, 218; 248/71, 231.51; 411/103, 411/546; 403/373
See application file for complete search history.

(56) References Cited

U.S. PATENT DOCUMENTS

| | | | | |
|---|---|---|---|---|
| 1,356,404 | A * | 10/1920 | Robinson | F16B 43/001 285/148.25 |
| 3,867,055 | A * | 2/1975 | Wooden | F16B 2/08 24/20 S |
| 4,238,165 | A * | 12/1980 | Wagner | F16B 39/26 403/408.1 |
| 6,520,710 | B2 * | 2/2003 | Wells | F01L 1/46 403/344 |

(Continued)

FOREIGN PATENT DOCUMENTS

GB 1030843 * 5/1966

*Primary Examiner* — Dennis H Pedder
(74) *Attorney, Agent, or Firm* — Warn Partners, P.C.

(57) ABSTRACT

A door rail surround assembly incorporating an anti-rotation feature added to a door rail clamp of the assembly. The anti-rotation feature is a net fit cross vehicle with a hole in the vehicle sport bar thereby eliminating any free movement of the door rail clamp assembly. A second clamp is rotatable for also receiving a fastener of the door rail clamp. A clamp load is applied to the vehicle when the fastener is inserted and torqued to its predetermined value. This clamping load prevents any free movement in the door rail clamp assembly when the door seal load is applied when the vehicle door is closed.

17 Claims, 10 Drawing Sheets

(56) References Cited

U.S. PATENT DOCUMENTS

| | | | |
|---|---|---|---|
| 6,776,551 B2* | 8/2004 | Linnenbuerger | F16B 2/065 24/19 |
| 2014/0178127 A1* | 6/2014 | Mottier | B62D 1/20 403/373 |
| 2018/0238359 A1* | 8/2018 | Cross | F16B 2/065 |

* cited by examiner

REMOVABLE DOOR SURROUND FOR A FOLDING SOFT TOP

CROSS-REFERENCE TO RELATED APPLICATIONS

This application is a continuation of U.S. patent application Ser. No. 15/958,025, filed Apr. 20, 2018, which claims the benefit of U.S. Provisional Application No. 62/487,763, filed Apr. 20, 2017. The disclosures of the above applications are incorporated herein by reference.

FIELD OF THE INVENTION

The present invention relates to a door rail assembly with anti-rotation features.

BACKGROUND OF THE INVENTION

Foldable roof soft tops are commonly used in sport-utility vehicles for moving between a closed position, and a sunroof position or further to one or more stowed positions. When in the closed position, the foldable roof protects the occupants of the vehicle from various weather conditions. However, there are occasions when it is desired by the occupants of the vehicle to move the foldable roof to an open position such that the vehicle essentially functions without part of a roof or essentially functions without a roof, or remove the top from the vehicle, and at least the passenger compartment of the vehicle is exposed to the atmosphere. This allows the occupants of the vehicle to enjoy more favorable weather conditions while driving.

The foldable soft tops are mounting to the vehicle. Known systems are described in U.S. Pat. Nos. 5,947,546 and 6,036,256. In conventional systems, U.S. Pat. No. 6,036,256, for example, the door seal applies a load to the door rail surround in the cross car direction when the vehicle door is closed. Due to build variations and component build tolerances in the vehicle body sport bar and the door rail surround, this load applies a force vector on the surround that results in the surround rotating about the vehicle body sport bar. This rotation of the door rail surround causes a poor fitting surround and reduces the sealing efficiency of the door sealing system resulting in potential water leak conditions into the vehicle interior.

Accordingly, there exists a need for an improved door rail surround with built in anti-rotation when fastened to the vehicle to eliminate free movement of the door rail when the door seal load is applied when the vehicle door is closed.

SUMMARY OF THE INVENTION

The present invention is directed to a door rail surround assembly incorporating an anti-rotation feature added to a door rail clamp. When fastened to the vehicle, the anti-rotation feature is a net fit cross vehicle with the vehicle attachment location thereby eliminating any free movement of the door rail clamp assembly. A second clamp is rotatable for also receiving a fastener of the door rail clamp. A clamp load is applied to the vehicle when the fastener is inserted and torqued to its predetermined value. This clamping load prevents any free movement in the door rail clamp assembly when the door seal load is applied when the vehicle door is closed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
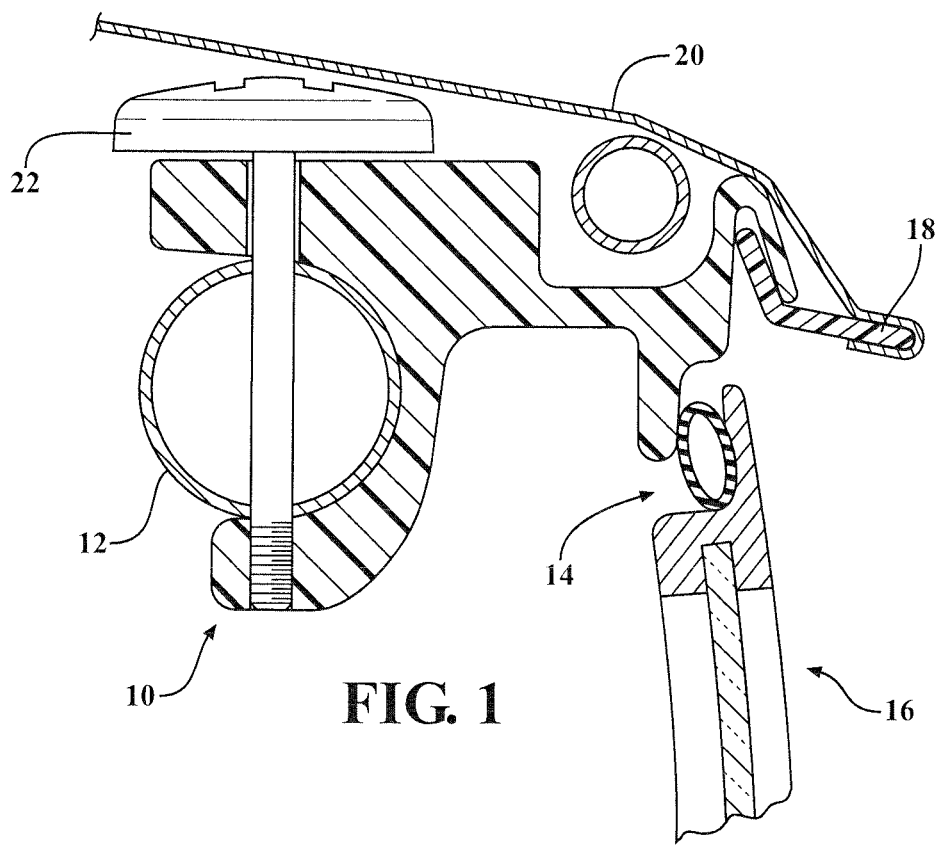
FIG. 1 is a sectional view of a conventional rail surround connected to a vehicle body sport bar, illustrating a door seal pressed against the door rail surround when a vehicle door assembly is closed.
Figure 2:
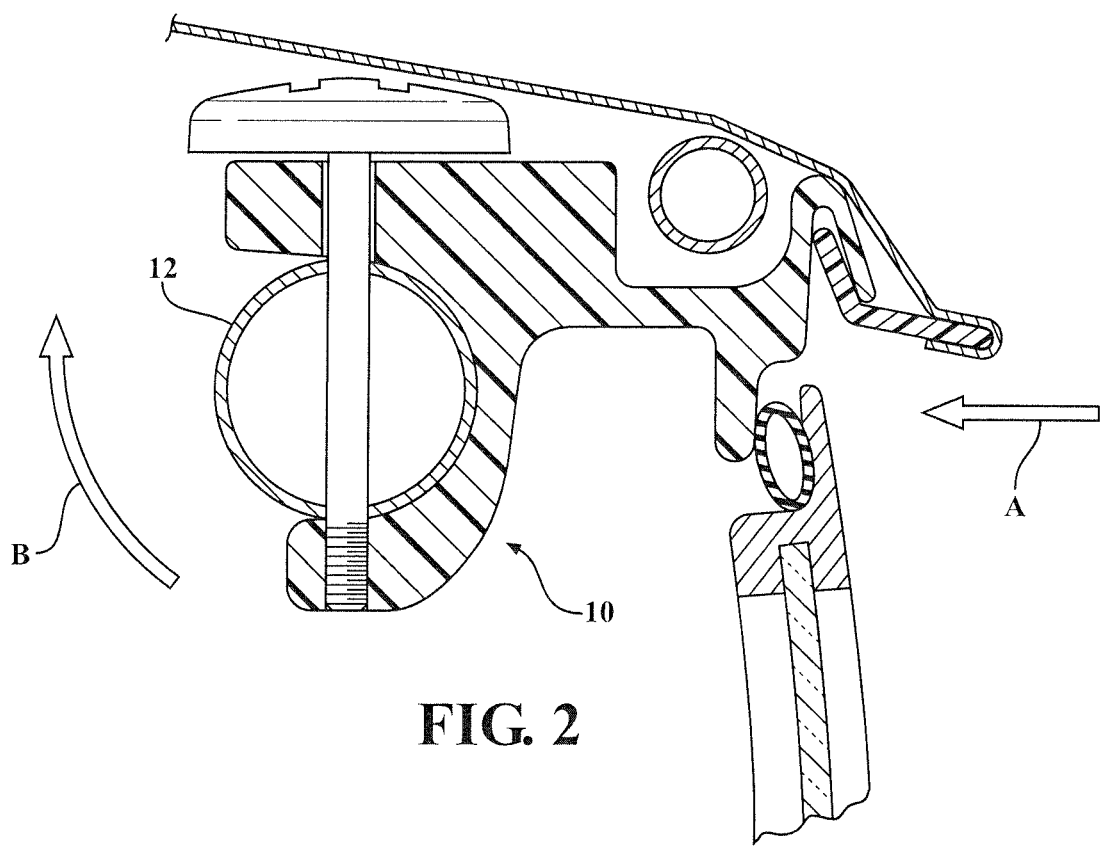
FIG. 2 is the sectional view of FIG. 1 depicting the direction of the door seal applying a load to the door rail surround, and an arrow illustrating the direction of rotation of the door rail surround about the vehicle sport bar from the applied load.
Figure 3:
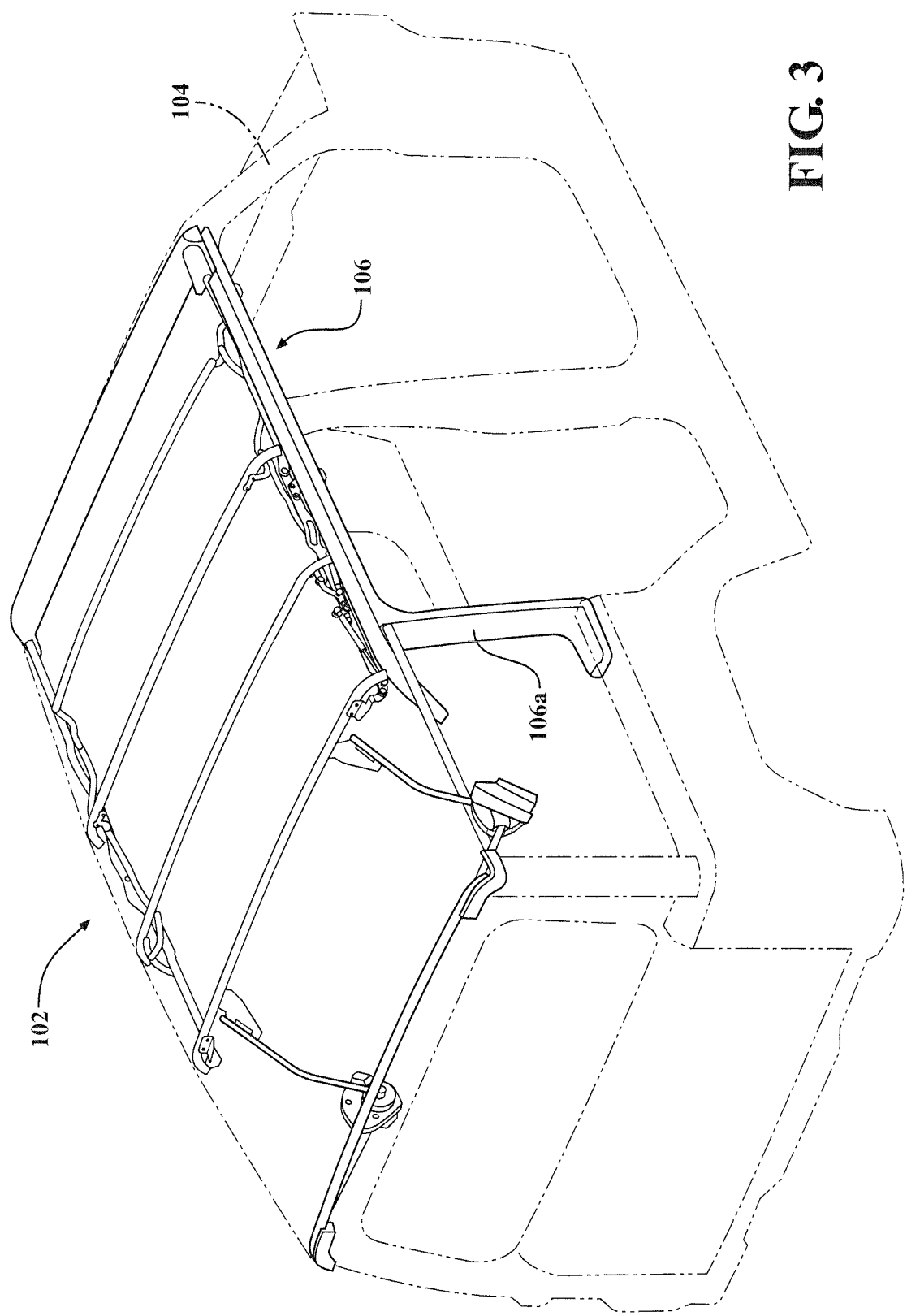
FIG. 3 is a rear perspective view of a vehicle with an exemplary soft top assembly and a door rail surround assembly, in accordance with the present invention.
Figure 4:
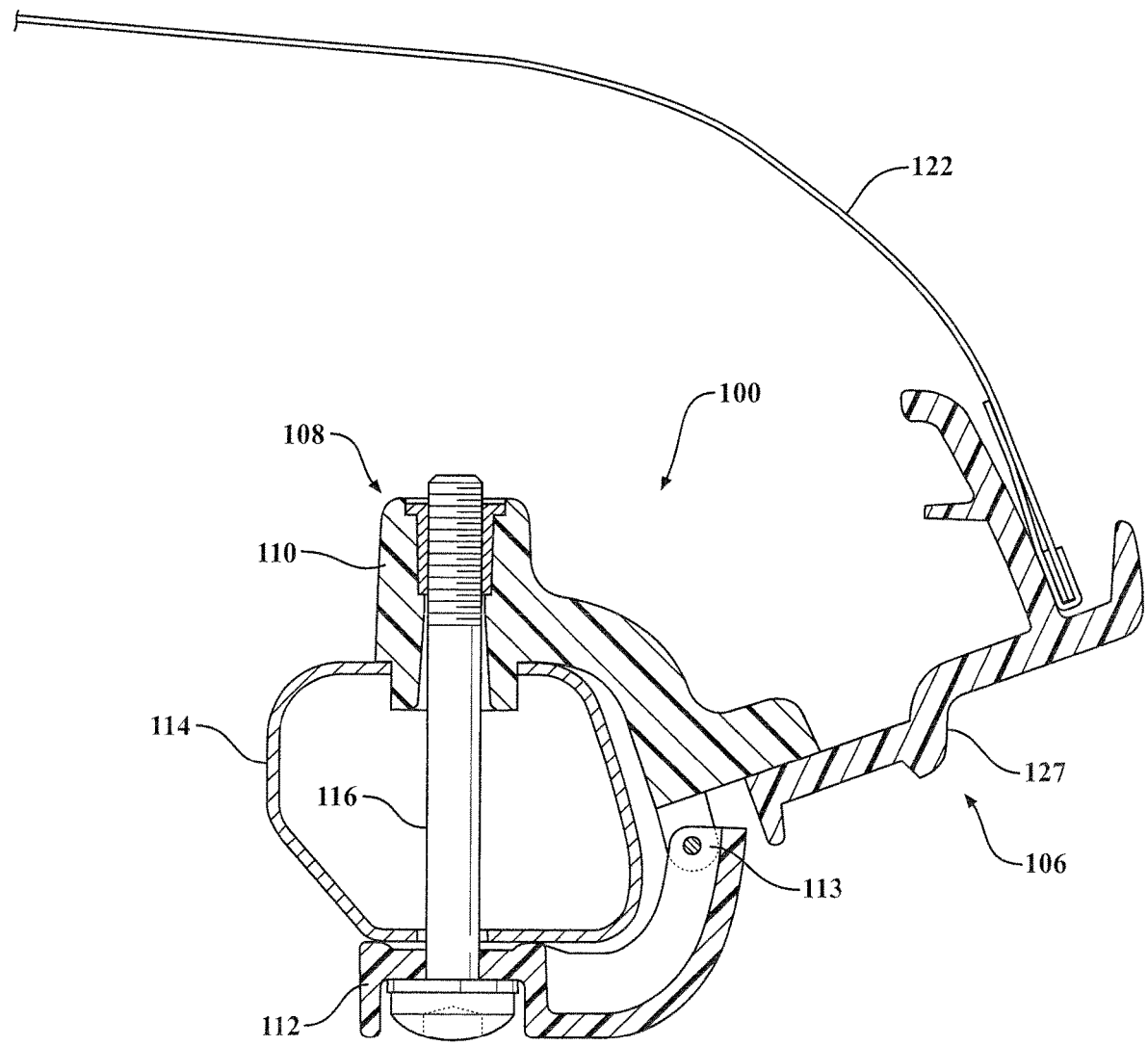
FIG. 4 is a cross sectional view of the door rail surround assembly connected to the vehicle, in accordance with the present invention.
Figure 5:
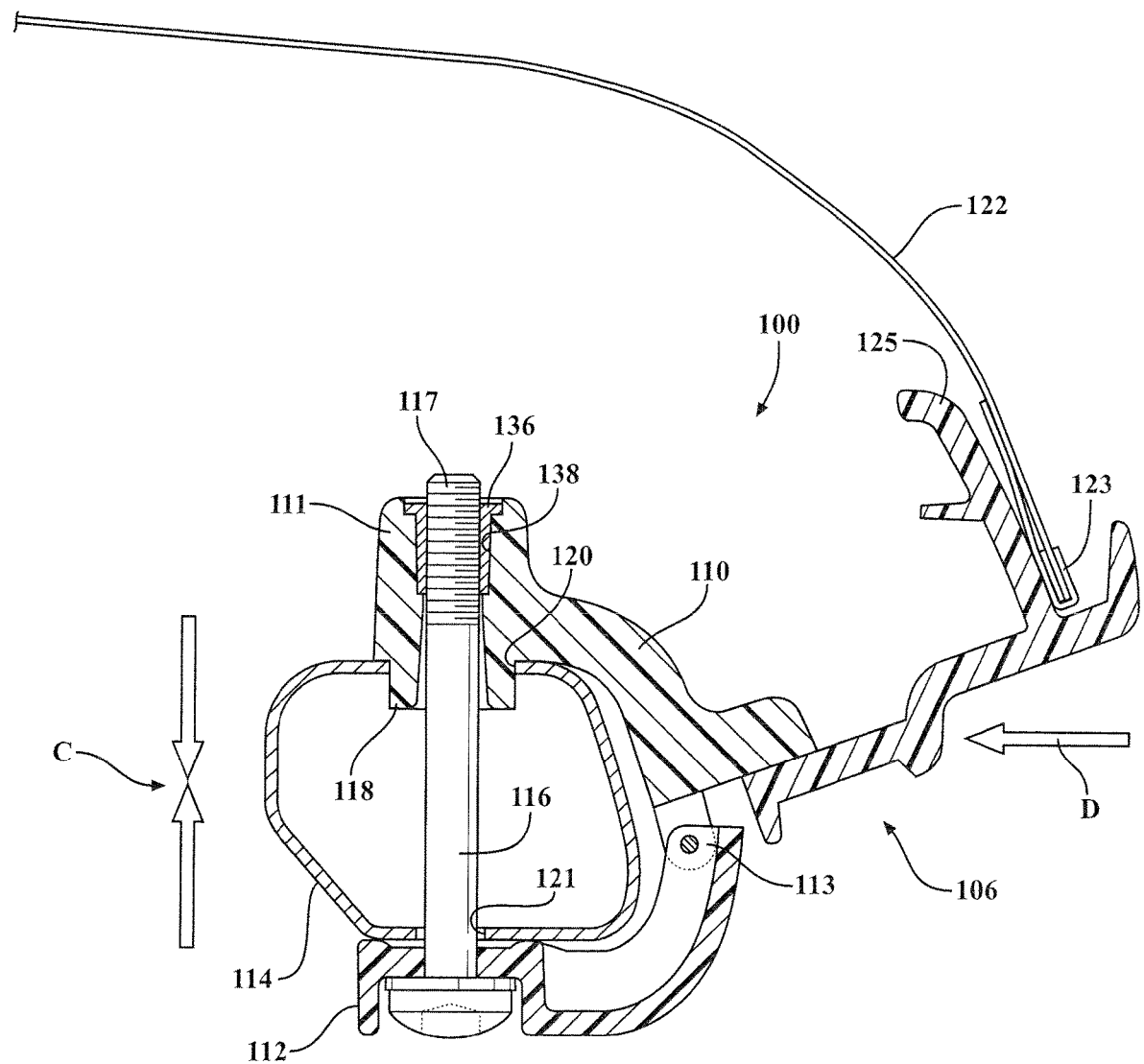
FIG. 5 is the cross section view of FIG. 4 depicting door seal loading and clamping load directions indicated by arrows, in accordance with the present invention.

Referring to FIGS. 1-2, there is depicted a known door rail surround 10 connected to a vehicle body sport bar 12. The rail surround 10 is in sealing engagement with a door seal 14 of a door assembly 16. The rail surround 10 includes a top cover retainer 18 connected to a top cover 20, and a door rail fastener 22 to connect the door rail surround 10 to the vehicle sport bar 12. The door seal 14 of the door assembly 16 applies a load (indicated by arrow 'A') to the door rail surround 10 in the cross car direction when the vehicle door is closed, e.g., in a direction toward the vehicle interior. Due to build variations and component build tolerances in the vehicle body sport bar 12 and the door rail surround 10, this load 'A' applies a force vector on the surround 10 that results in the surround 10 rotating (indicated by arrow 'B') about the vehicle body sport bar 12. This rotation of the door rail surround 10 causes a poor fitting surround 10 and reduces the sealing efficiency of the door sealing system resulting in potential water leak conditions into the vehicle interior.

Referring to FIGS. 3-12 generally, a door surround assembly according to the present invention is shown generally at 100 for a soft top assembly. An exemplary soft top assembly is shown generally at 102. At least one door surround assembly is mountable to the vehicle 104 and is operably selectively removable. Preferably, at least one pair of door surround assemblies 104 are mounted at each side of the vehicle adjacent a roof top opening. At least one door seal of the door assembly can be provided and pressed against the door surround assembly 100 to provide a weather tight seal when the vehicle door is closed. The door rail surround assembly 100 is mounted to the vehicle and stays in place whether or not the soft top is closed/opened or removed. However, the door surround 100 is designed to be removable, for efficient removal when desired.

The door rail surround assembly (or "assembly") 100 includes at least one door rail surround portion shown generally at 106 and at least one door rail clamp assembly portion shown generally at 108 including at least two halves. Each door rail clamp assembly portion 108 has at least one first clamp half 110, e.g., upper clamp 110, and at least one second clamp half 112, e.g., lower clamp. The first and second clamps 110,112 operably connect to a vehicle structure, most preferably a sport bar 114 by at least one fastener 116. The first clamp 110 is most preferably operably fixedly connected to the door rail surround portion 106. Preferably, the first clamp 110 includes a protruding portion 111 that receives the fastener 116, most preferably, a threaded end 117 of the fastener 116. The second clamp 112 includes at least one aperture 115 that receives the at least on fastener 116.

Figure 9:
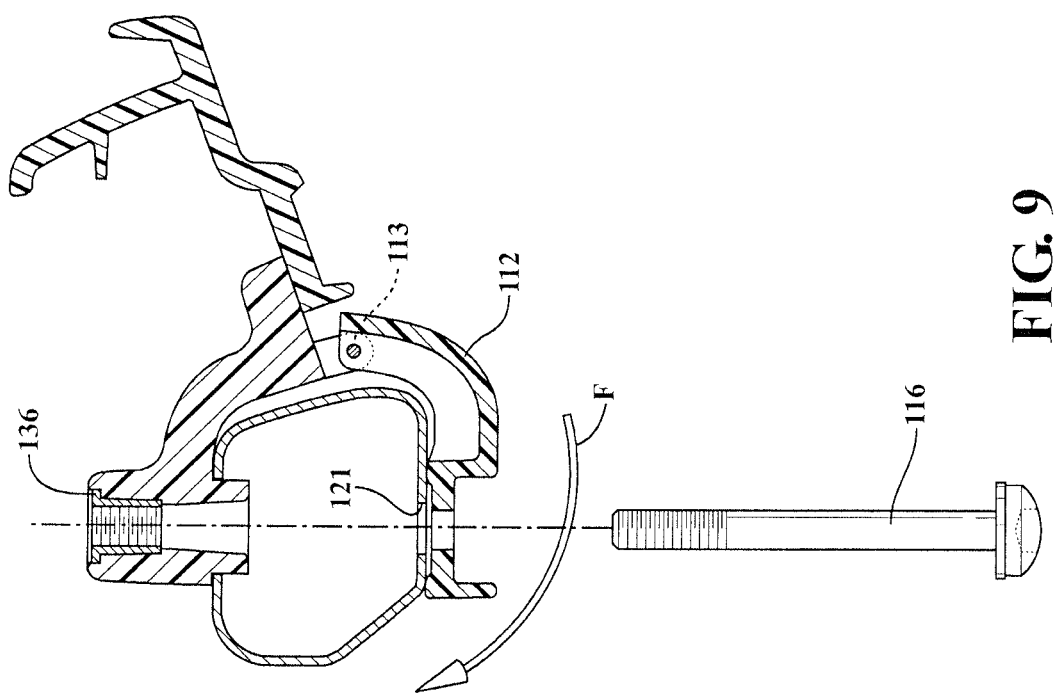

The second clamp 112 is operably pivotally connected to the door rail surround portion 106, preferably, pivotally connected to the first clamp 110, and rotates to a clamping position (as indicated by arrow 'F' in FIG. 9). Most preferably, the second clamp 112 is pivotally connected to the first clamp 110 by at least one pivot joint 113.

At least one anti-rotation feature 118 is provided on the door rail clamp assembly portion 108 to prevent the clamp assembly portion 108 from rotating. Typically, the at least one anti-rotation feature 118 is integrally formed with the first clamp 110. Preferably, the at least one anti-rotation feature 118 extends from a surface of the first clamp 110 in a direction generally toward the top of the sport bar 114. Most preferably, the at least one anti-rotation feature 118 is a boss. The anti-rotation feature 118 is inserted into a fastener aperture 120 located in the vehicle body, e.g., preferably, a fastener aperture 120 of the sport bar 114, most preferably, an aperture 120 on the upper surface of the sport bar 114. The anti-rotation feature 118 is a net fit cross vehicle inside the aperture 120 thereby eliminating any free movement of the door rail clamp assembly 108. A clamp load (indicated generally by arrows 'C' in FIG. 5) is applied to the vehicle body sport bar 114 when the fastener 116 is inserted (into the clamp assembly 108 and sport bar 114) and torque applied (e.g., as indicated by arrow 'E' in FIG. 10) to a predetermined value. This clamping load prevents any free movement in the door rail clamp assembly 108 (and surround 106) when the door seal load (as indicated by arrow 'D' in FIG. 5) is applied when the vehicle door is closed in the direction indicated by arrow 'D'.

At least one second aperture 121 is located in the vehicle structure 114, preferably, on a bottom surface of the sport bar 114 to receive the at least one fastener 116 into the aperture 115 of the second clamp 112 and into the sport bar 114.

While a threaded fastener 116 is depicted, it is understood that the at least one fastener 116 may be any other fastener and arrangement suitable to securely connect the clamp assembly 108 to a predetermined vehicle structure, depending on the particular application without departure from the scope of the present invention.

The soft top assembly 102 includes at least one top cover 122 that covers the roof top opening. Preferably, the top cover 122 includes a binding 123 on a side top deck portion, and, when in the top closed position, comes over the top of the door rail surround 106 and operably engages at least one sealing feature 125 of the door rail surround 106, most preferably, resting against the outward facing surface of the sealing feature 125. When closed, the top cover 122 and door rail surround portion 106 operably create a weather resistant seal. Preferably, the door seal 14 engages against the outward facing surface 127 of a protruding feature on the door rail surround 106 when the vehicle door 16 is closed.

Preferably, there are at least two clamping assemblies 108 located on each door surround assembly 100. Most preferably, each door surround 106 has at least two clamping assemblies 108 that each align with at least one predrilled original equipment manufacturer aperture in the sport bar 114 for each of the at least one fastener 116 so that a no-drill installation of the door surround assembly 100 is possible.

Figure 11:
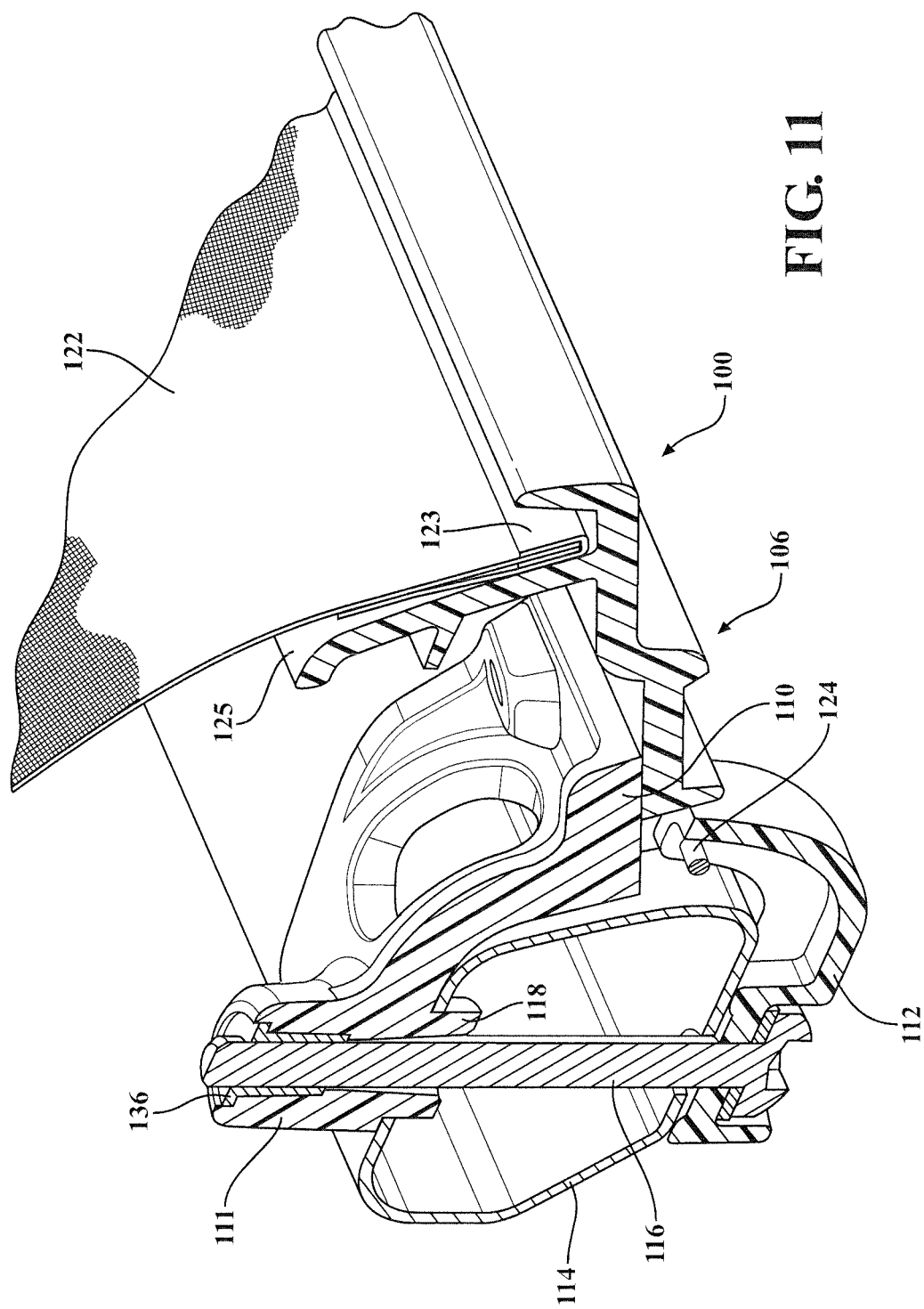
FIG. 11 is a perspective view illustrating the door rail surround assembly connected to the vehicle sport bar, in accordance with the present invention; and, FIG. 12 is an exploded view of the clamp assembly of the door rail surround assembly, in accordance with the present invention.
Figure 12:
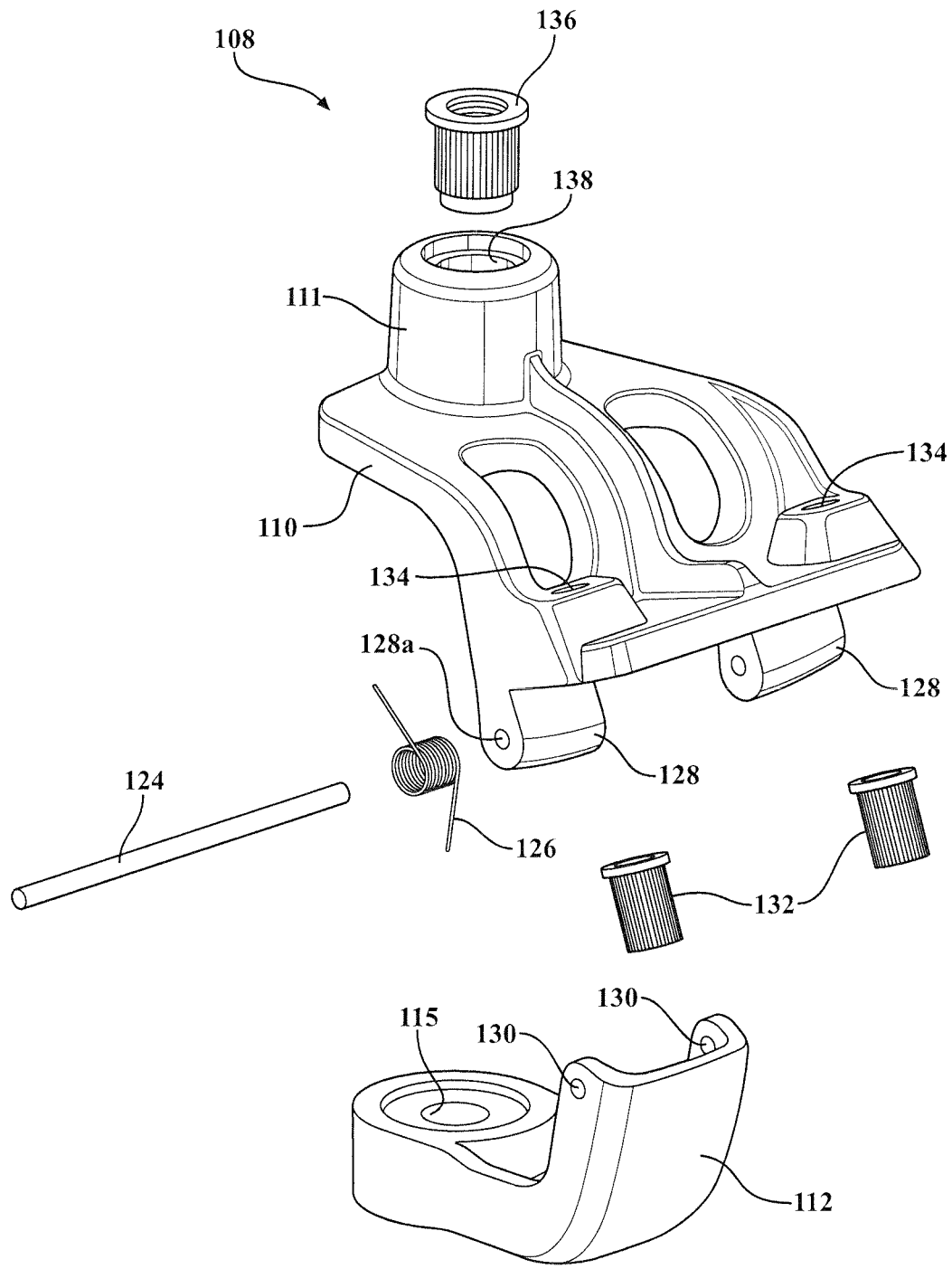

Referring more particularly to FIGS. 11 and 12, the clamp assembly 108 includes a clamp pivot pin 124 and biasing member 126, e.g., torsion spring, operable for a pivotal connect of the second clamp 112 to the first clamp 110. The first clamp 110 includes at least one hinge portion 128, preferably, a pair of hinge portions 128, each including an aperture 128a. The second clamp 112 includes at least one aperture 130, preferably, a pair of apertures 130. Most preferably, the pin 124 extends through the plurality of apertures 128a,130.

The clamp assembly 108 is operably connected to the door surround 106. Preferably, the first clamp 110 is connected to the door surround 106 with adhesive and/or at least one fastener, most preferably, at least two fasteners (such as screws). Most preferably, at least one threaded insert 132, preferably, at least one pair of threaded inserts 132, are inserted into at least one aperture 134, preferably, a pair of apertures 134, formed in the first clamp 110. These threaded inserts 132 allow the fastener to grip for attachment of the first clamp 110 to the door surround 106.

Another threaded insert 136 is located in another aperture 138 in the first clamp 110 to engage the fastener 116. Preferably, the threaded insert is in the protruding portion 111 of the first clamp 110.

Figure 6A:
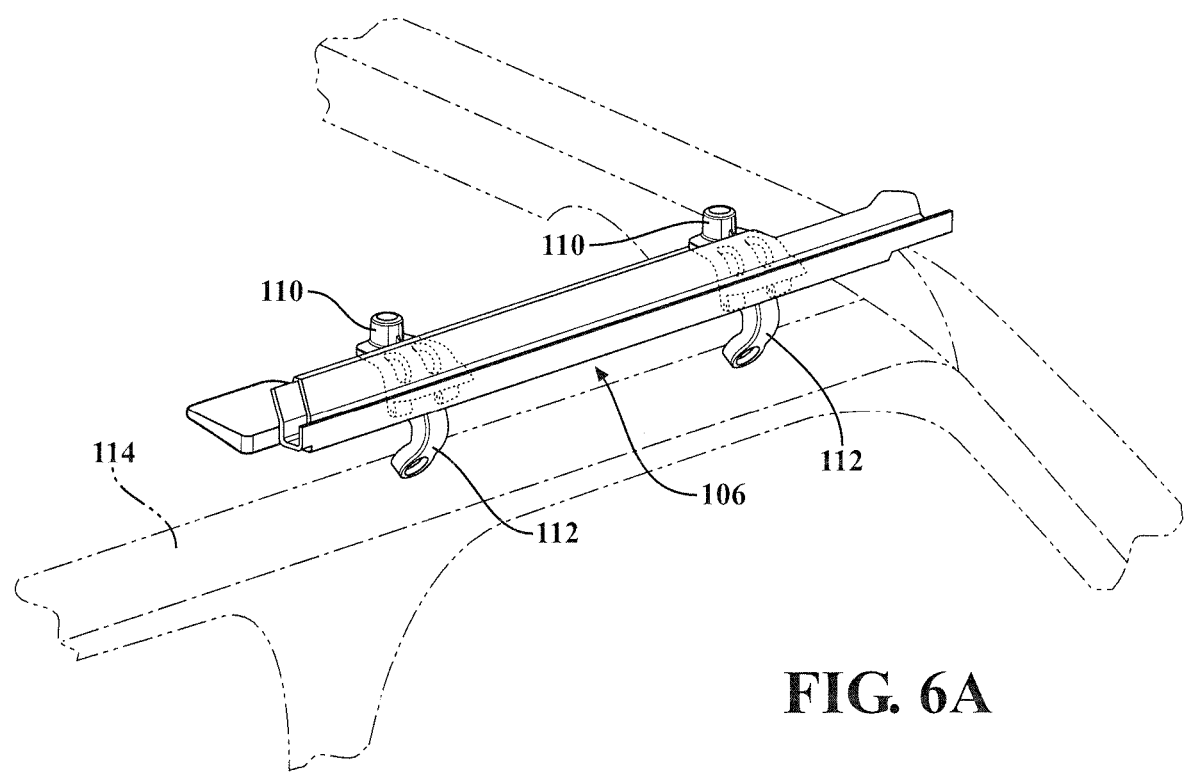
FIGS. 6A-6D are perspective views depicting installation of the door rail surround assembly to the vehicle, in accordance with the present invention.
Figure 6B:
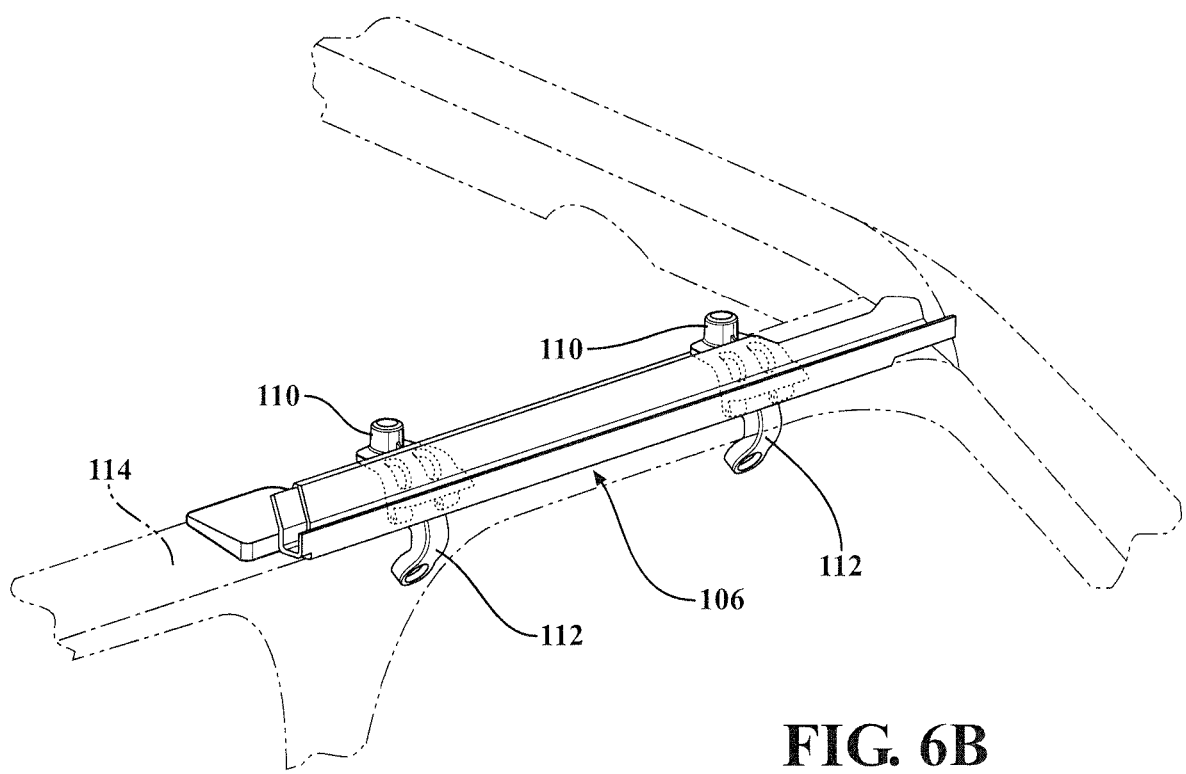
Figure 6C:
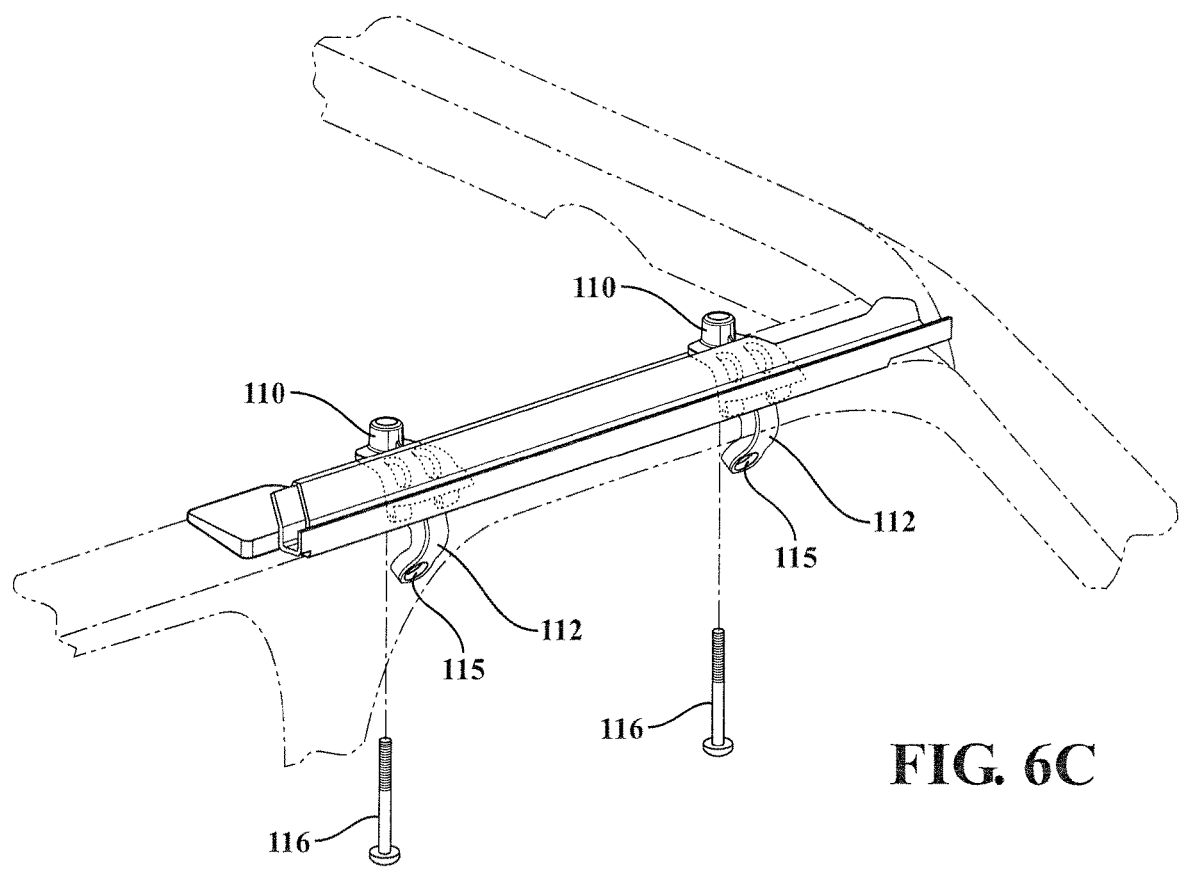
Figure 6D:
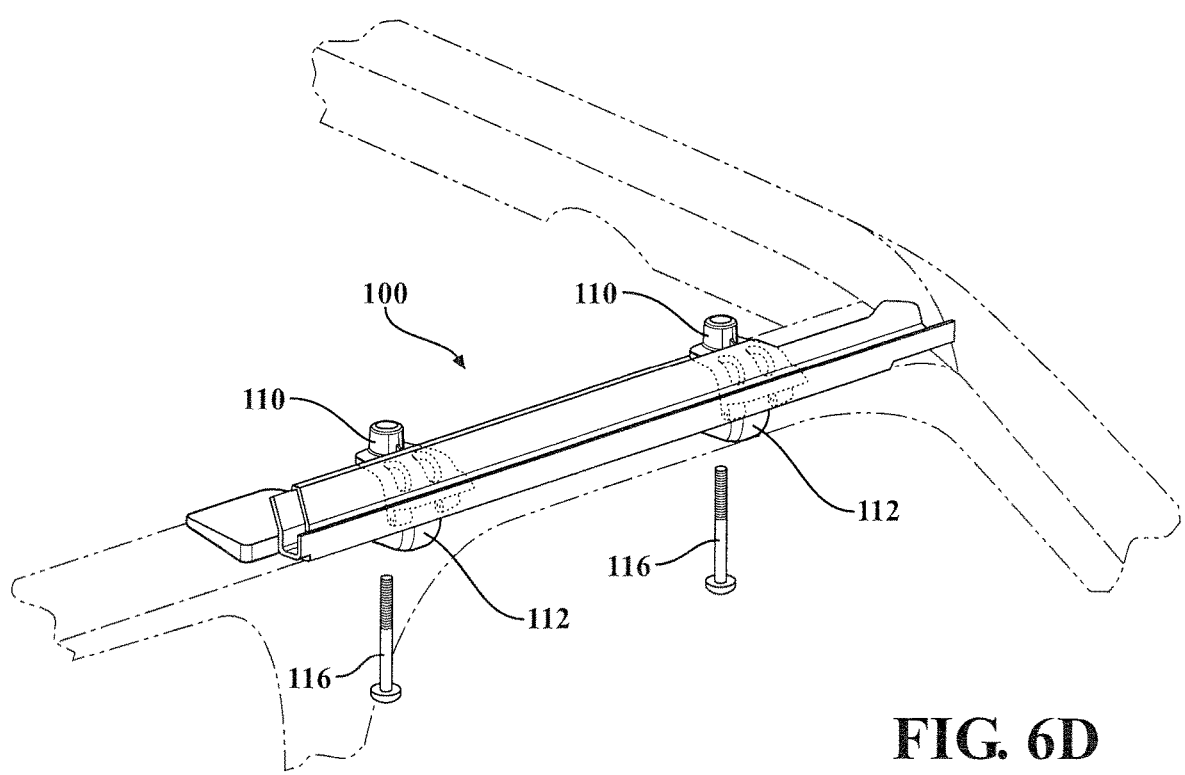
Figure 8:
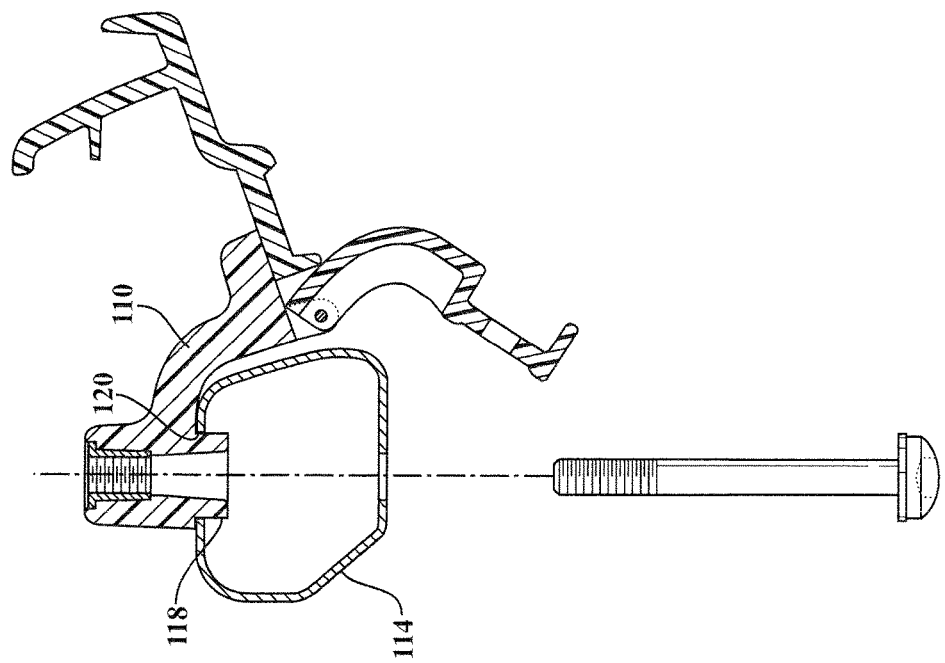
FIGS. 7-10 are cross sectional views depicting installation of the door rail surround assembly to the sport bar of the vehicle, in accordance with the present invention.
Figure 7:
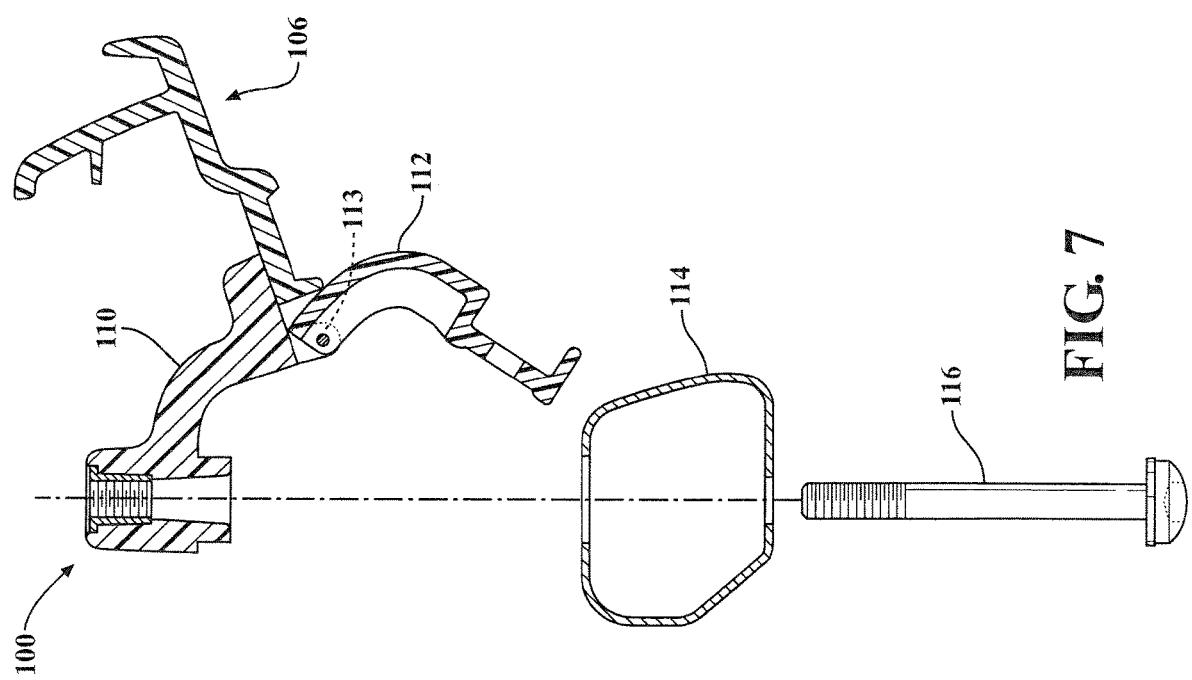
Figure 10:
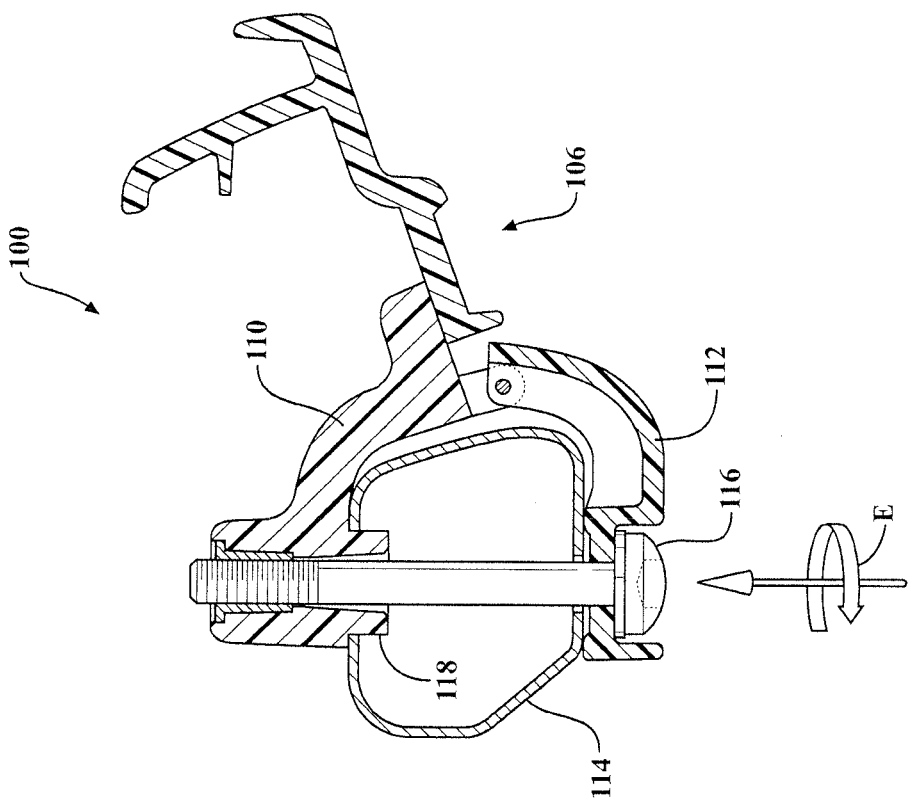

Referring now more particularly to FIGS. 6A-10, the door surround assembly 100 is connected to the sport by 114 by aligning the door rail assembly 100 with predetermined areas of the vehicle body sport bar 114 (e.g, see FIGS. 6A and 7). The door rail assembly's anti-rotation feature 118 is inserted into the aperture 120 of the vehicle body sport bar 114 (e.g., see FIG. 8). The second clamp 112 is rotated to align with the other aperture 121 in the sport bar 114 (e.g., see FIGS. 6D and 9). Preferably, the apertures 120,121 are on opposing sides of the sport bar 114 such as the top and bottom surfaces. The first and second clamps 110,112 are then secured to the sport bar 114 with the fastener 116 (see FIG. 10), which secures the door rail to the vehicle. Preferably, each door surround assembly 100 has two clamp assemblies 108. It is understood that more or less than two clamp assemblies 108 for each door rail surround 106 are contemplated without departure from the scope of the present invention.

The door surround assembly 100 can be a single segment or more than one segment. Preferably, the door surround 106 expanse is generally over the front door. Alternatively, adapted for at least generally over the rear door. Alternatively, adapted for generally over the front and rear door in a single or multiple piece segment. In a most preferred embodiment, the door surround is over the front door, and a coupled rear door segment includes a track or channel for receiving slidable features of the soft top assembly to slide for stowing rear of the rear cockpit or removing the top from the vehicle. Most preferably, for four-door vehicles, for example, the door rail surround 106 is a front door surround and is operably coupled to a rear door surround 106*a* or integrally formed therewith. It is understood that the door rail surround 106 can be a single piece or multiple pieces operably connected together, e.g., adhesive and/or at least one fastener, depending on the application without departure from the scope of the present invention.

With the arrangement and combination of features of the present invention, the door rail surround assembly 100 is selectively removable from the vehicle, when desired, and easily reinstalled, as desired.

The left side door surround assembly is a substantially mirror image to the right side 100 depicted in the figures.

While a 4-door vehicle is illustrated, it is understood that the present invention is adaptable for a 2-door vehicle, 2 or 4-door SUV with extended cargo area, slanted back, folding/sliding soft top, front compartment soft top, front and rear compartment soft top, full roof soft top, soft top with linkages for rotation to sunroof positions, soft top incorporating fabric management bows, lift assist soft tops, any other suitable top, hard top, etc, and combinations thereof without departure from the scope of the present invention.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A door rail surround assembly adapted for a soft top assembly for a convertible roof of a vehicle, comprising:
   a door rail surround portion;
   at least one door rail clamp assembly operably connected to the door rail surround portion and adapted to connect to a predetermined vehicle structure with at least one fastener that has threads, said door rail clamp assembly including an anti-rotation feature that restricts free movement of the door rail surround assembly;
   wherein the door rail clamp assembly includes at least a first clamp and a second clamp, wherein said second clamp is rotatable.

2. The door rail surround assembly of claim 1, wherein said first or second clamp is connected to said door rail surround portion.

3. The door rail surround assembly of claim 2, further comprising at least one threaded insert located in a respective aperture formed in the first clamp for operably fastening said first clamp to said door rail surround portion.

4. The door rail surround assembly of claim 1, wherein said second clamp is rotatably connected to said first clamp.

5. The door rail surround assembly of claim 4, wherein the door rail clamp assembly includes a pin extending through a plurality of apertures on the first and second clamps for a pivotal connection.

6. The door rail surround assembly of claim 4, wherein said second clamp includes an aperture to receive said at least one fastener.

7. The door rail surround assembly of claim 1, further comprising at least one threaded insert located in a respective aperture formed in said at least one door rail clamp assembly to connect said at least one fastener to said at least one door rail clamp assembly.

8. The door rail surround assembly of claim 1, wherein the door rail surround portion includes at least one sealing feature with a surface adapted for sealing engagement with a door seal.

9. The door rail surround assembly of claim 1, wherein each door rail clamp assembly further includes:
   said first clamp having an aperture for said fastener; and
   said second clamp having another aperture for said fastener,
   wherein said vehicle structure is a sport bar including an upper aperture and a lower aperture, and
   wherein said at least one fastener extends into said first and second clamp apertures and said sport bar apertures to secure said door rail clamp assembly to said sport bar.

10. The door rail surround assembly of claim 9, wherein said first clamp is positioned on top of said sport bar of said vehicle and said second clamp is rotatable to the bottom of said sport bar and then said at least one fastener is inserted to secure the door rail clamp assembly to said sport bar.

11. The door rail surround assembly of claim 1, wherein said anti-rotation feature is a boss that is inserted into an aperture formed in said vehicle structure.

12. The door rail surround assembly of claim 11, wherein said boss is provided on said first clamp that is an upper clamp of said door rail clamp assembly and is inserted into said aperture of said vehicle structure to connect to said second clamp that is a lower clamp by said at least one fastener received in said lower clamp and said boss.

13. The door rail surround assembly of claim 12, wherein a clamp load is applied to said sport bar when said at least one fastener is inserted into said boss and torqued to a predetermined value.

14. The door rail surround assembly of claim 1, wherein at least two door rail clamp assemblies are connected to each door rail surround.

15. A removable door rail surround assembly adapted for a soft top assembly for a convertible roof of a vehicle, comprising:
   a door rail surround portion with a surface adapted for a door seal to press against in a load direction;
   a pair of door rail clamp assemblies connected to the door rail surround portion, each of said door rail clamp assemblies including a first clamp operably connected to said door rail surround portion and a second clamp rotatably connected to said first clamp;
   an anti-rotation feature provided on each of said first clamps, said each anti-rotation feature adapted to insert into a respective aperture formed in a sport bar of said vehicle to restrict free movement of said door rail clamp assembly; and
   a threaded portion provided in an aperture of said first clamp for connecting to at least one fastener that has threads, wherein said at least one fastener is adapted to secure the first and second clamps to opposing upper and lower surfaces of said sport bar.

16. The removable door rail surround assembly of claim 15, wherein said second clamp is hinged to said first clamp by a pin and biasing member.

17. The removable door rail surround assembly of claim 15, wherein, with said anti-rotation feature inserted into said sport bar aperture, said fastener extends through aligned apertures formed in the second clamp, bottom and top surfaces of said sport bar, and into said anti-rotation feature where said fastener is secured by threads located in the anti-rotation feature, wherein a clamp load restricts free movement of said door rail clamp assembly when a door seal load is applied when a vehicle door is closed.

\* \* \* \* \*